United States Patent
Haddadin et al.

(10) Patent No.: US 9,014,312 B1
(45) Date of Patent: Apr. 21, 2015

(54) MULTI-BAND DIRECT SAMPLING TRANSMITTER

(75) Inventors: Osama S. Haddadin, Salt Lake City, UT (US); Francis J. Smith, Park City, UT (US); Joseph D. Spencer, Murray, UT (US); Rebekah Reeder, Portland, OR (US)

(73) Assignee: L-3 Communications, Corp., New York, NY (US)

( * ) Notice: Subject to any disclaimer, the term of this patent is extended or adjusted under 35 U.S.C. 154(b) by 694 days.

(21) Appl. No.: 13/153,038

(22) Filed: Jun. 3, 2011

(51) Int. Cl.
| | |
|---|---|
| H03D 1/04 | (2006.01) |
| H04L 27/26 | (2006.01) |
| H04L 25/03 | (2006.01) |
| H04B 1/10 | (2006.01) |
| H04N 5/44 | (2011.01) |

(52) U.S. Cl.
CPC ...... *H04L 27/2647* (2013.01); *H04L 25/03038* (2013.01); *H04B 1/1027* (2013.01); *H04N 5/4401* (2013.01)

(58) Field of Classification Search
CPC .............. H04L 25/03038; H04L 27/2647; H04N 5/4401; H04B 1/1027
USPC .................................. 375/295–315
See application file for complete search history.

(56) References Cited

U.S. PATENT DOCUMENTS

| | | | |
|---|---|---|---|
| 7,436,910 B2 | 10/2008 | Fudge et al. | |
| 7,436,911 B2 | 10/2008 | Fudge et al. | |
| 7,489,745 B2 | 2/2009 | Fudge | |
| 7,539,464 B2* | 5/2009 | Suzuki et al. | 375/296 |
| 8,149,894 B2* | 4/2012 | Fudge | 375/133 |
| 2002/0018531 A1* | 2/2002 | Ratto | 375/297 |
| 2007/0081617 A1* | 4/2007 | Fudge | 375/350 |
| 2011/0075780 A1* | 3/2011 | Petrovic | 375/355 |
| 2011/0110313 A1* | 5/2011 | Eu et al. | 370/329 |

OTHER PUBLICATIONS

Vaughan, Rodney G., "The Theory of Bandpass Sampling," article, IEEE Transactions on Signal Processing, vol. 39, No. 9, Sep. 1991.
Frerking, Marvin E., "Digital Signal Processing in Communications Systems," book, 1994, Van Nostrand Reinhold, New York.
"Sampling (signal processing)," Wikipedia encyclopedia definition, Jul. 27, 2010, www.en.wikipedia.org/wiki/Sampling_(signal_processing).
Groden, Michael, et al., "Wideband Receiver with Wideband Track and Hold," International Microwave Symposium, Jun. 7-12, 2009.
U.S. Appl. No. 13/153,068, filed Jun. 3, 2011, Haddadin et al.

* cited by examiner

*Primary Examiner* — Dac Ha
*Assistant Examiner* — Janice Tieu
(74) *Attorney, Agent, or Firm* — Kirton McConkie

(57) ABSTRACT

A radio signal transmission technique includes selecting a sample rate from a plurality of predefined sample rates so that the radio signal is contained entirely within a Nyquist zone corresponding to the sample rate. A digitized signal is converted to an analog signal, spectrally enhanced, and passed through a selected one of a plurality of selectable bandpass filters to form the radio signal.

21 Claims, 3 Drawing Sheets

MULTI-BAND DIRECT SAMPLING TRANSMITTER

The present application is related to the application entitled "MULTI-BAND DIRECT SAMPLING RECEIVER" filed the same day as the present application and herein incorporated by reference to the extent its teachings do not conflict with the present application.

FIELD

The present application relates to wireless communications. More particularly, the present application relates to wireless communications using direct sampling.

BACKGROUND

Wireless communications is becoming increasingly important, with wireless systems finding their way into every growing numbers of applications. Wireless systems have become ubiquitous in the military environment.

Wireless communications can involve transmitting and receiving a radio frequency signal (e.g., a propagating radio wave). As spectrum has become scarcer, systems have been moving to higher and higher frequency communications bands. Many communications systems operate at carrier frequencies of several giga-Hertz (GHz) and above.

Transmission and reception of radio frequency signals has traditionally required a large number of analog components. Moreover, the components typically used in the radio frequency electronics of a transmitter and receiver have not enjoyed the same rapid advances in miniaturization and cost reduction as have digital components. Hence, the radio frequency electronics portion of transmitters and receivers often consume a large portion of allowable size, weight, and power budgets for equipment designs.

One trend in wireless communications is the use of so-called software-defined radios. In general, a software-defined radio uses digital processing to perform functions traditionally performed in analog components. Unfortunately, since propagating radio waves and other types of wireless signals are in an analog form, it is still necessary to convert between the analog domain and the digital domain. Moreover, components available for performing such conversions have limited operating speeds. Accordingly, there are a number of challenges in attempting to implement software define radios, particularly at frequencies of 2 GHz and above.

SUMMARY

In some embodiments of the invention, a method of transmitting a radio signal is provided. The radio signal can be in any one of a plurality of different frequency bands. The method can include converting a digitized signal to an analog signal and enhancing the analog signal at a sample rate to form a spectrally-enhanced signal. The sample rate can be selected from a plurality of predefined sample rates so that the radio signal is contained entirely within a Nyquist zone corresponding to the sample rate. Another operation in the method can be passing the spectrally-enhanced signal through a selected one of a plurality of selectable bandpass filters to form the radio signal. The selected one of the bandpass filters can have a passband encompassing the radio signal.

In some embodiments of the invention, a system for transmitting a radio signal is provided. The radio signal can be in any one of a plurality of different frequency bands. The system can include a means for converting a digitized signal to an analog signal and a means for enhancing the analog signal at the sample rate to form a spectrally-enhanced signal. A means for selecting a sample rate from a plurality of predefined sample rates can be included. The sample rate can be selected so that the radio signal is contained entirely within a Nyquist zone corresponding to the sample rate. The system can also include a means for passing the spectrally-enhanced signal through a selected one of a plurality of selectable bandpass filters to form the radio signal. The selected one of the bandpass filters can have a passband encompassing the radio signal.

In some embodiments of the invention, a system for transmitting a radio signal is provided. The radio signal can be in any one of a plurality of different frequency bands. The system can include a plurality of bandpass filters. Each bandpass filter can have a passband and a center frequency. The passbands and center frequencies can correspond to a predefined set of communications bands. A switching network can be coupled to the plurality of bandpass filters. The switching network can be arranged so that a signal present at an input to the network is passed through a selectable one of the plurality of bandpass filters to produce the radio signal at an output of the network. The system can also include a signal enhancer and a digital to analog converter. The digital to analog converter can accept a digitized input and provide an analog output. The analog output can be provided to the signal enhancer which can provide an output provided to the input of the switching network. A programmable sample clock generator can output a sample clock to the signal enhancer. The programmable sample clock generator can generate a selected one of a plurality of different sample clock rates.

BRIEF DESCRIPTION OF THE DRAWINGS

Additional features and advantages of the invention will be apparent from the detailed description that follows, taken in conjunction with the accompanying drawings, that together illustrate, by way of example, features of the invention; and, wherein.

DETAILED DESCRIPTION

Figure 1:
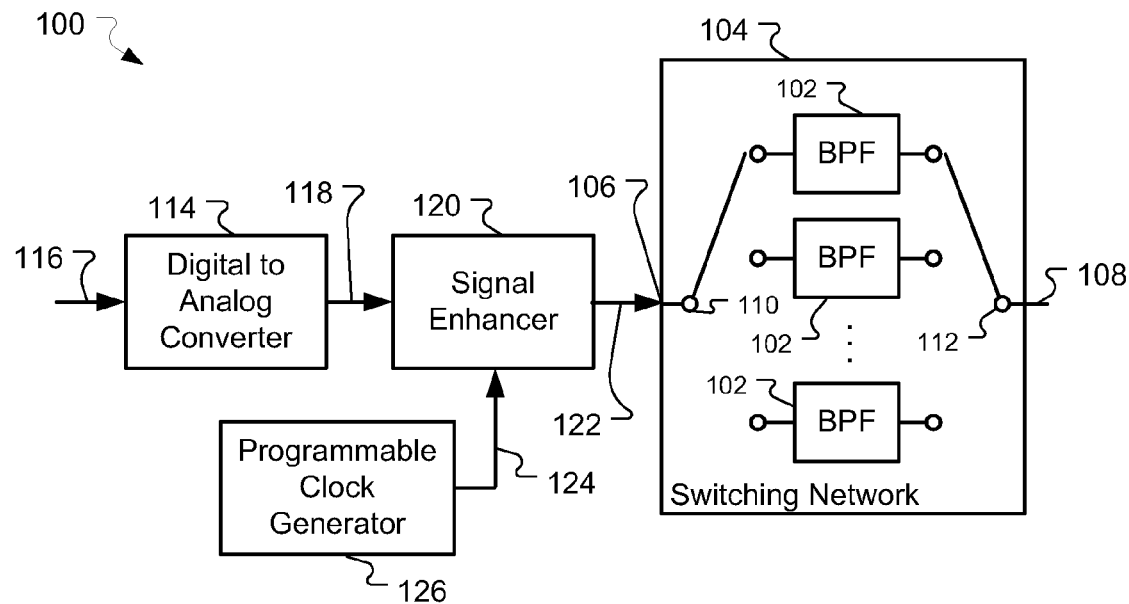
FIG. 1 is a block diagram of a transmit system in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to an item includes reference to one or more of said item.

The term "ones" refers to one, two, or more, and generally applies to the selection of some or all of a quantity. The term "plurality" refers to two or more of an item.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

As used herein, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also to include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

As used herein, the term "alternatively" refers to selection of one of two or more alternatives, and is not intended to limit the selection to only those listed alternatives or to only one of the listed alternatives at a time, unless the context clearly indicates otherwise.

Turning to FIG. 1, transmission system is illustrated in accordance with some embodiments of the present invention. The system, shown generally at 100, can include a plurality of bandpass filters 102. The bandpass filters can be operatively coupled to a switching network 104 to allow passing a signal present at the network input 106 through a selected one of the bandpass filters to produce a filtered signal at the network output 108. For example, the switching network can include an input switch 110 that selectively connects the network input to a selected one of the bandpass filters and an output switch 112 that selectively connects the network output to a selected one of the bandpass filters. Although the input switch and output switch are shown as single pole multiple throw switches, it will be appreciated that various types of switching arrangements can be used for routing signals through the selected one of the bandpass filters. As another example, the switching network can include a distribution amplifier (not shown) which provides an amplified version of the network input to each of the bandpass filters and an output switch selects the output of the selected one of the bandpass filters. Various other arrangements can also be used.

The system 100 can also include a digital to analog converter 114. The digital to analog converter can convert a digitized signal 116 into an analog signal 118. The analog output can be provided to a signal enhancer 120, which can provide a spectrally enhanced signal 122 to the network input 106. The signal enhancer can operate at a sample rate driven by a sample clock 124 provide by a programmable sample clock generator 126. In some embodiments, the digital to analog converter can operate at the same clock rate as the signal enhancer. In some embodiments, for example as explained in further detail below, the digital to analog converter can operate at a different clock rate than the signal enhancer. In some embodiments, the digital to analog converter need not operate at a regular sample rate, but can produce samples in a burst or batch mode (e.g., storing analog samples in an analog storage such as a delay line) which are then enhanced and clocked out by the signal enhancer at the sample rate.

Operation of the system 100 in some embodiments will now be described. The digitized signal 116 can be a signal that is to be transmitted in a desired frequency band. The desired frequency band can be, for example, any one of a plurality of frequency bands. For example, the frequency bands can be C-band, X-band, Ku-band, etc. As a specific example, one band can extend between about 5.925 GHz and about 6.24 GHz, one band can extend between about 7.9 GHz and about 8.4 GHz, and one band can extend between about 14 GHz and about 14.5 GHz. The frequency bands need not be contiguous to each other. The digitized signal can be a modulated signal (e.g., encoding data into frequency, phase, amplitude, pulse position, etc.) which encodes information (e.g., digital data) into the signal. For example, the digitized signal can be generated by a modulator (not shown).

Figure 2:
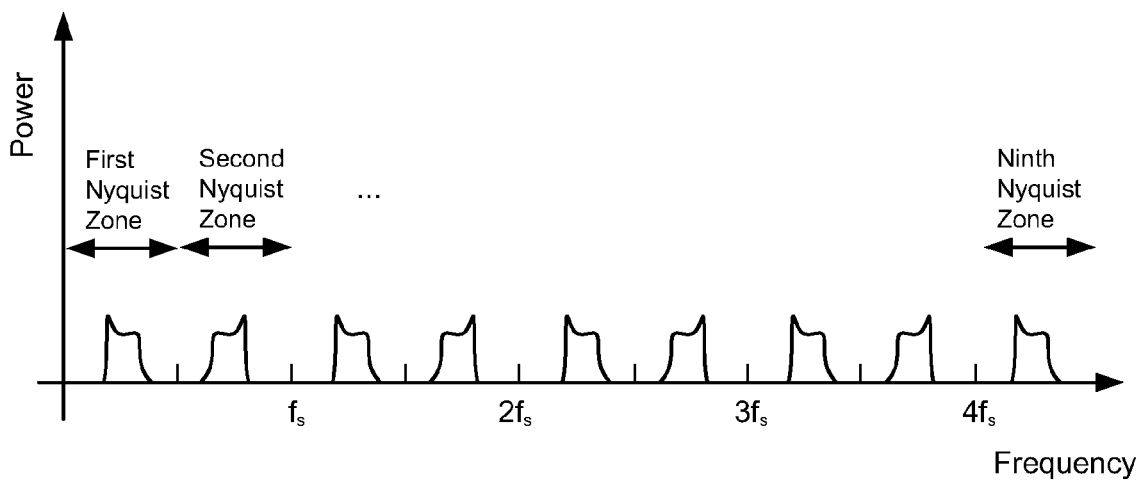
FIG. 2 is a graph showing aliases of a sampled signal in accordance with some embodiments of the present invention.

The digitized signal 116 can be accepted by the digital to analog converter 114 and converted into an analog signal 118. Because the digitized signal is a discrete time signal, when converted into an analog signal, there can be replicas (aliases) of the digital signal at multiples of the sample rate of the digital signal. The different replicas correspond to different Nyquist zones defined by the sample rate. For example, FIG. 2 provides an illustration of the spectrum of a hypothetical analog signal produced by an analog converter. In the digital domain, the signal spectrum which extends over a frequency range from 0 to $\pi$ is mapped to the frequency range between 0 and $f_s/2$. Aliases of the signal spectrum are also produced, replicating the signal in each Nyquist zone (note that some Nyquist zones have the spectrum inverted). The relative strength of the spectrum in each Nyquist zone depends upon the characteristics of the analog to digital converter. For example, some analog to digital converters provide an approximately $\sin(f)/f$ characteristic roll off power with increasing frequency f. Accordingly, the relative amplitude (power) of the different aliases can vary depending on the characteristics of the digital to analog converter. If desired, in some embodiments, compensation for this variation can be provided by changing the amplitude of the digitized signal as a function of which Nyquist zone is used, as explained further below. In addition, the analog to digital converter can also produce spurious signals and other undesired products (which can, in some embodiments, be filtered out).

In a conventional system, the first Nyquist zone is typically used, and a low pass filter is used to filter out the aliases. In contrast, in some embodiments of the present invention, Nyquist zones other than the first Nyquist zone can be used. For example, when using a sample rate of 4 GHz, an alias of the signal spectrum is provided every 2 GHz. Thus, a signal in the frequency range of 14-16 GHz can be obtained by using the 8$^{th}$ Nyquist zone. Accordingly, the switching network 104 can be used to select a desired one of the bandpass filters 102 which corresponds to the desired frequency band.

The signal enhancer 120 can be included between the analog signal output of the digital to analog converter 114 and the network input 106 of the switching network 104. The signal enhancer can be used to spectrally enhance the analog signal. For example, a theoretical signal can consist of impulses at the sample rate, each impulse having a power corresponding to the digital signal value for the corresponding sample. Such a theoretical signal provides equal power in each of the Nyquist zones extending from zero frequency to infinity. Of course, such a theoretical signal cannot be reproduced by practical analog circuits. The signal enhancer can, in some embodiments, approximate an impulse. In some embodiments, the signal enhancer can comprise a narrow pulse generator. In some embodiments, the signal enhancer can comprise a sample and hold. A sample and hold can result in a sin(f)/(f) roll off of the amplitude as a function of frequency, thus reducing power available in higher Nyquist zones. In some embodiments, the signal enhancer can comprise a differentiator. A differentiator tends to enhance power at higher frequencies, and thus can help to reduce sin(f)/(f) roll off for an analog to digital converter which provides such a response. Thus, by providing a spectrally enhanced signal to the switching network, improved efficiency can be obtained. In some embodiments, the signal enhancer can be included in the analog to digital converter, and in some embodiments, the signal enhancer can be omitted.

The sample rate of the sample clock 124 can be selected to ensure that the desired Nyquist zone properly lines up with a desired frequency band. For example, it will be appreciated that filtering of frequencies close to a multiple of half the sample rate can be difficult, since the aliases from other Nyquist zones can be very close. Moreover, it can be difficult or impossible to produce an (undistorted) spectrum which spans across a multiple of half the sample rate. Accordingly, the sample rate can be selected so that the signal is contained entirely within a Nyquist zone corresponding to the sample rate. Table 1 below provides non limiting examples of frequency bands, sample rates, and Nyquist zones which can be used in some embodiments.

TABLE 1

Example Frequency Bands, Associated Bandwidths, and Sampling Clocks

| Frequency Band (GHz) | Center Freq (GHz) | Bandwidth (GHz) | Sample Clock (GHz) | Nyquist Zone |
|---|---|---|---|---|
| 1.71-1.85 | 1.78 | 0.14 | 0.34 | 11 |
| 3.31-3.71 | 3.51 | 0.40 | 2.81 | 3 |
| 7.25-7.75 | 7.5 | 0.50 | 3.34 | 5 |
| 7.90-8.40 | 8.15 | 0.50 | 3.63 | 5 |
| 7.20-8.80 | 8.00 | 1.60 | 3.56 | 5 |
| 14.40-14.83 | 14.62 | 0.43 | 3.90 | 8 |
| 15.05-15.35 | 15.2 | 0.30 | 3.58 | 9 |

Accordingly, based on the desired frequency band the signal is to be transmitted in, a suitable sample rate can be selected for the programmable sample clock generator 126 so that the desired frequency band falls within a selected Nyquist zone. A suitable one of the bandpass filters 102 can be selected using the switching network 104 to selectively pass the desired frequency band within the selected Nyquist zone while rejecting aliases corresponding to other Nyquist zones. The system can operationally switch to a different frequency band during operation if desired.

The switching network and programmable sample clock generator can be controlled by a controller (not shown), which can for example, include processing resources to perform necessary calculations and output control signals to the programmable clock generator and switching network based on inputs defining the desired frequency and bandwidth of operation. The controller can determine the sample rate based on the desired center frequency and bandwidth of the signal to be output, for example as shown in Table 1. For example, the controller can be a processor, digital memory look up table, or the like.

The output signal 108 from the switching network 104 can be the radio signal used for transmission. In some embodiments, the transmission system 100 can also include additional components (not shown), such as power amplifiers, upconverters, diplexers, duplexers, antennas, frequency references, and the like.

Figure 3:
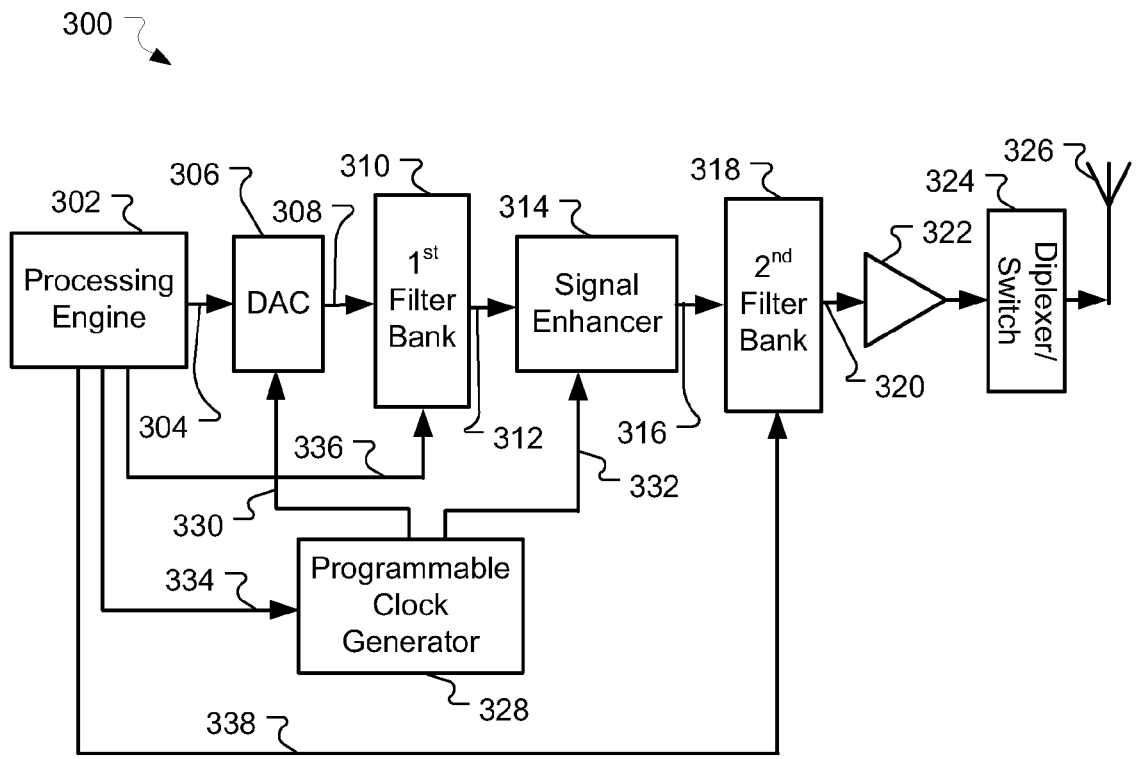
FIG. 3 is a block diagram of another transmit system in accordance with some embodiments of the present invention.

FIG. 3 illustrates another embodiment of a transmitting system 300 which provides similar features as described above for FIG. 1 while augmenting the capability of the system. The system can include a processing engine 302. The processing engine can include processing resources to implement a digital modulator to generate a digital signal 304. The processing engine can also include processing resources to implement error correction encoding, symbol mapping, pulse shaping, frequency tuning, amplitude compensation (e.g., for sin(f)/f roll off described above), and the like. In some embodiments, the processing engine can be implemented using a field programmable gate array (FPGA). In some embodiments, the processing engine be implemented using a digital signal processor (DSP). The digital signal can be provided to a digital to analog converter 306. The digital analog converter can be like the digital to analog converter 114 of FIG. 1.

The analog output 308 of the digital to analog converter 306 can be provided to a first filter bank 310. The first filter bank can be, for example, like the bandpass filters 102 and switching network 104 of FIG. 1 and can operate in a similar manner. The first filter bank can provide for intermediate frequency (IF) bandpass filtering. For example, the first filter bank can be used to selective pass a selected one of a plurality of Nyquist zones corresponding to the sample rate (e.g., a resampling rate) of the digital to analog converter. In some embodiments, the first filter bank can be replaced by a filter with a filter having a fixed, pre-determined filter passband. The first filter bank can interpolate the analog signal 308 to form an interpolated signal 312 at the output.

The output 312 of the first filter bank 310 can be provided to a signal enhancer 314. In some embodiments, the signal enhancer can be like the signal enhancer 120 of FIG. 1 (e.g., a differentiator or a track and hold). The signal enhancer can operate at a sample rate (e.g., an enhancer rate) that is the same as or different from the digital to analog converter 306. When the enhancer rate is different from the resampling rate, a first set of aliases (corresponding to the enhancer rate) can be produced by the enhancer, and a second, different set of aliases can be produced by the digital to analog converter 306 (corresponding to the resampling rate). The enhanced signal 316 output from the signal enhancer 314 can be passed through a second filter bank 318. The second filter bank can be, for example, like the bandpass filters 102 and switching network 104 of FIG. 1 and can operate in a similar manner. The second filter bank can provide for radio frequency (RF) bandpass filtering. In some embodiments, the second filter bank can be replaced with a filter having a fixed, pre-determined filter passband. The filtered output 320 of the second filter bank can be provided to a power amplifier 322, diplexer/switch 324, and antenna 326 to produce a propagating radio signal. The diplexer/switch can be used to combine a transmit system with a receive system (e.g., like any of the receive systems disclosed in the cross-referenced application). A programmable clock generator 328 can provide the sample clocks 330, 332 to the digital to analog converter and the signal enhancer. For example, the programmable sample clock generator can provide clock rates selected from a plurality of different clock rates. In some embodiments, the programmable sample clock generator can be implemented using a programmable divider driven from a reference oscillator (or other clock source). The system can also include components (not shown) such as filters, amplifiers, frequency references, and the like.

Because the digital to analog converter 306 and signal enhancer 314 can operate at different sample rates, greater flexibility in frequency band selection can be obtained as compared to FIG. 1. Thus, the processing engine 302 can determine the frequencies of the sample clocks 330, 332 and provide control information 334 to the programmable clock generator 328 to set the desired frequencies. For example, the digital to analog converter 306 can use a resampling clock 330 at a first rate (resampling rate) and the signal enhancer can use a sampling clock 332 at a second rate (sampling rate; enhancer rate) different from the first rate. The processing engine can also provide control information 336, 338 to set the filter banks to desired passbands.

The system 300 can provide several degrees of freedom in selecting resampling rate, sampling rate, and filters as a function of the desired output frequency and bandwidth. In some embodiments, the resampling rate can be selected to be at least twice the desired bandwidth of the signal and the sampling rate can be selected to provide a desired center frequency of the signal wherein the bandwidth of the signal fits within a Nyquist zone of the sample rate.

The system 300 can provide for flexibility in accommodating transmission of signals in a number of different communications bands. For example, the system can be configured into a first configuration to transmit a signal in a first communications band (e.g., any of L, S, C, X, Ku, Ka bands). In the first configuration, the resampling rate can be set to a first resampling rate and the sampling rate can be set to a first sampling rate. The filter banks can be set to pass a first desired one of the Nyquist bands. The processing engine 302 can calculate the resampling rate, sampling rate, and filter bank settings based on the frequency and bandwidth of the transmitted radio signal. Alternatively, the processing engine can include a table which specifies the resampling rate, sampling rate, and filter bank settings for a number of different communications bands.

The system 300 can operationally switch to transmit a signal in a second frequency band. For example, to operate in the second frequency band, a second configuration which comprises a second resampling rate, a second sampling rate, a second frequency shift, and second filter bank settings based on the frequency/bandwidth of the transmitted signal.

The system 300 can avoid the need for an upconverter, providing entirely digital tuning. If desired, the capability of the system can be extended by can including an upconverter (not shown) within the transmit chain. For example, the upconverter can be between the signal enhancer 314 and $2^{nd}$ filter bank 318, or between the $2^{nd}$ filter bank and the amplifier 322. The upconverter can provide for shifting (e.g., increasing) the frequency of the transmitted radio signal. The amount of upconversion can be variable and can be programmed along with sample rate, resampling rate, and other operational parameters. When an upconverter is included, the frequencies of the bandpass filters can thus correspond to desired communications bands plus or minus a frequency offset corresponding to the amount of upconversion.

Figure 4:
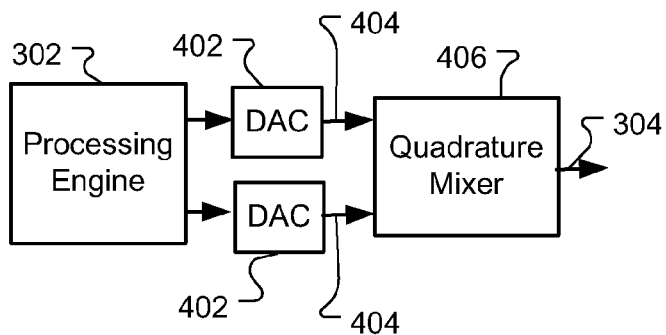
FIG. 4 is a block diagram of a quadrature arrangement of digital to analog converters which can be used in the systems of FIG. 1 and FIG. 3.

FIG. 4 illustrates an alternate arrangement of a portion of a transmit system which can be used with complex (inphase/quadrature) digital signals. For example, the system 300 of FIG. 3 can be modified so that processing engine 302 provides two digital outputs (e.g., inphase and quadrature) which are provided to two digital to analog converters 402 to provide quadrature analog signals 404. The quadrature analog signals can be combined in a quadrature mixer 406 to provide the analog signal 304. In some embodiments, the resampling rate used by the digital to analog converters can be reduced in half as compared to the unmodified version of FIG. 3. This can allow for higher radio signal frequency, wider radio signal bandwidth, or both.

In other embodiments, the quadrature mixer 406 can be moved to the right of the $1^{st}$ filter bank 310, the signal enhancer 314, or the $2^{nd}$ filter bank 318. In this case, second ones of the $1^{st}$ filter bank, signal enhancer, and $2^{nd}$ filter bank can be included thus providing a quadrature path through these components.

Figure 5:
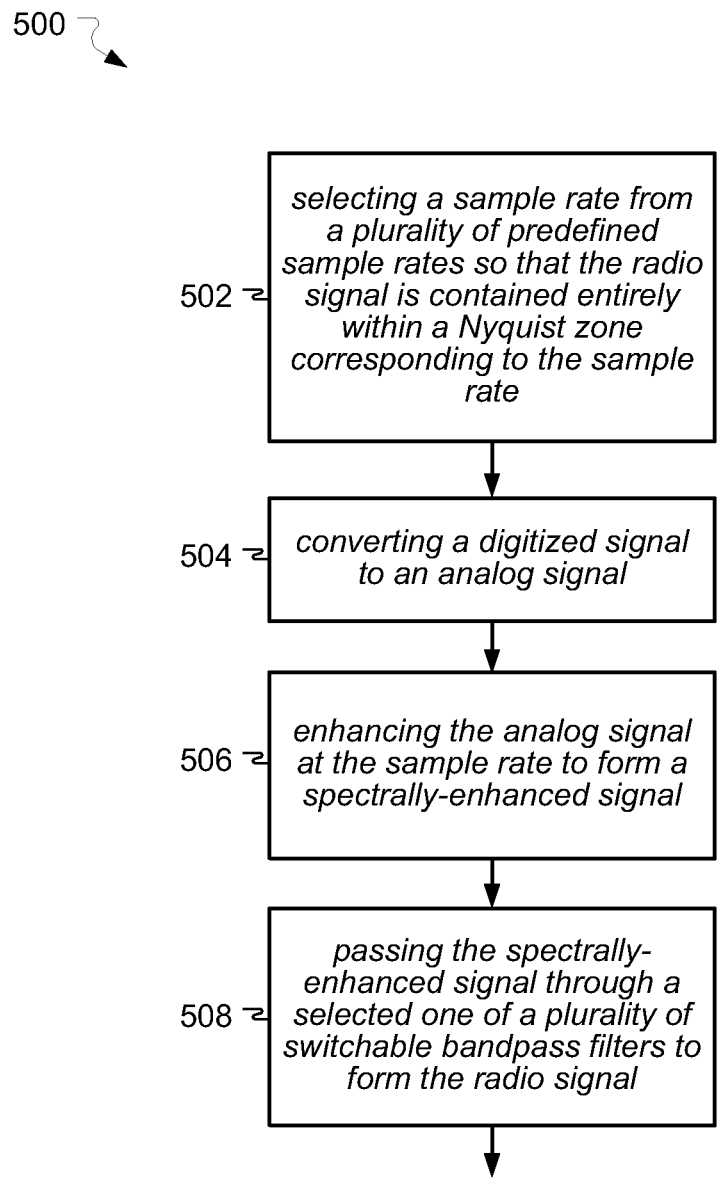
FIG. 5 is flow chart of a method for transmitting a radio signal in accordance with some embodiments of the present invention.

FIG. 5 illustrates a flow chart of a method of transmitting a radio signal. The method, shown generally at 500, can for example be performed by the systems 100, 300 of FIGS. 1 and 3. Alternatively, other systems can be used to perform the method.

The method 500 can include selecting 502 a sample rate from a plurality of predefined sample rates so that the radio signal to be produced can be contained entirely within a Nyquist zone corresponding to the sample rate. For example, as described above, a predefined sample rate can be defined for different communications bands in which the radio signal is to be transmitted. There can be any plurality of different communications bands, any one of which can be selected. As another example, as described above, the sample rate can be computed from the bandwidth/frequency of the radio signal. The sample rate can be determined by a controller (e.g., as described above) and used to program a programmable sample clock generator (e.g., as described above).

The method 500 can also include converting 504 a digitized signal to an analog signal. The converting can be performed by any suitable means for converting a digitized signal to an analog signal. For example, the converting can be performed by one or more analog to digital converters, for example, as described above. The digitized signal can be a modulated signal (e.g., as described above).

Another operation in the method 500 can be enhancing 506 the analog signal at the sample rate to form a spectrally-enhanced signal. The enhancing can be performed by any suitable means for creating a spectrally-enhanced signal. For example, as described above, enhancing can be performed by a sample and hold, differentiator, impulse generator, or similar devices.

Also included in the method 500 can be passing 508 the spectrally-enhanced signal through a selected one of a plurality of selectable bandpass filters to form a filtered signal. The selected one of the bandpass filters can have a passband encompassing the radio signal. In particular, the passband can encompass desired portions of the radio signal. For example, the stopband of the bandpass filter can remove undesired aliases corresponding to other Nyquist zones (and spurious signals, sidelobes, or other undesired signals). For example, as described above, a filter bank can be provided which can have a plurality of bandpass filters, and one of the bandpass filters can be selected. As another example, one or more filter components can be selectively connected or interconnected to provide a bandpass filter with the desired bandwidth and center frequency.

Various examples of transmit systems have been illustrated. It will be appreciated that the transmit system of FIG. 1 can also include features illustrated in the transit system of FIG. 3, and vice versa. Moreover, while several illustrative applications have been described, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims. While several illustrative applications have been described, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims.

What is claimed is:

1. A method of transmitting a radio signal wherein the radio signal is in any one of a plurality of different frequency bands, the method comprising:
    selecting a first sample rate to correspond to an Nth Nyquist zone that contains entirely an intermediate band frequency, where N is an integer greater than or equal to one;
    converting with a digital-to-analog converter a digitized signal to an analog signal at the first sample rate;
    selecting from a first set of selectable bandpass filters a first bandpass filter having a passband that contains entirely the intermediate band frequency;
    passing the analog signal through the selected first bandpass filter to form an intermediate signal;
    selecting a second sample rate to correspond to an Mth Nyquist zone that contains entirely a frequency band of the radio signal, where the frequency band is one of the plurality of different frequency bands and M is an integer greater than or equal to one;
    enhancing with a signal enhancer the intermediate signal at the second sample rate to form a spectrally-enhanced signal;
    selecting from a second set of selectable bandpass filters a second bandpass filter having a passband that contains entirely the frequency band of the radio signal; and
    passing the spectrally-enhanced signal through the selected second bandpass filter to form the radio signal.

2. The method of claim 1, wherein the plurality of different frequency bands are not contiguous.

3. The method of claim 2, wherein the plurality of different frequency bands comprises:
    a band extending between about 5.925 GHz and about 6.425 GHz; and
    a band extending between about 7.9 GHz and about 8.4 GHz.

4. The method of claim 3, wherein the plurality of different frequency bands further comprises a band extending between about 14 GHz and about 14.5 GHz.

5. The method of claim 1, wherein the first sample rate and the second same rate are the same.

6. The method of claim 1, wherein the first sample rate is different than the second sample rate.

7. The method of claim 6, wherein:
    the converting produces a first set of aliases in the analog signal, and
    the passing the analog signal through the selected one of the first set of band pass filters substantially removes the first set of aliases from the intermediate signal.

8. The method of claim 7, wherein:
    the enhancing produces a second set of aliases in the spectrally-enhanced signal, and
    the passing the spectrally-enhanced signal through the selected one of the second set of band pass filters substantially removes the second set of aliases from the radio signal.

9. The method of claim 1, wherein the enhancing increases power of the intermediate signal.

10. The method of claim 1, wherein the enhancer comprises a differentiator.

11. The method of claim 1, wherein the enhancer comprises a sample and hold module.

12. The method of claim 1, wherein M is greater than one.

13. The method of claim 12, wherein N is greater than one.

14. A system for transmitting a radio signal wherein the radio signal is in any one of a plurality of different frequency bands, the system comprising:
    means for selecting, based on a desired frequency and bandwidth of a radio signal to be produced from a digital signal, a first sample rate to correspond to an Nth Nyquist zone that contains entirely an intermediate band frequency and a second sample rate to correspond to an Mth Nyquist zone that contains entirely a frequency band of the radio signal from a plurality of different predefined sample rates, wherein the frequency band is one of the plurality of different frequency bands, N is an integer greater than or equal to one, and M is an integer greater than or equal to one;
    means for selecting a first bandpass filter from a first set of different bandpass filters having a passband that contains entirely the intermediate band frequency and a second filter from a second set of different bandpass filters having a passband that contains entirely the frequency band of the radio signal;
    means for converting the digitized signal to an analog signal at the first sample rate;
    means for passing the analog signal through the selected first bandpass filter to form an intermediate signal;
    means for enhancing the intermediate signal at the second sample rate to form a spectrally-enhanced signal; and
    means for passing the spectrally-enhanced signal through the selected second bandpass filter to form the radio signal.

15. The system of claim 14, wherein the first sample rate and the second sample rate are the same.

16. The system of claim 14, wherein the first sample rate and the second sample rate are different.

17. The system of claim 14, wherein the means for enhancing increases power of the intermediate signal.

18. The system of claim 14, wherein the means for enhancing comprises a differentiator.

19. The system of claim 14, wherein the means for enhancing comprises a sample and hold module.

20. The system of claim 14, wherein M is greater than one.

21. The system of claim 20, wherein N is greater than one.

* * * * *